United States Patent
Schmidt et al.

(10) Patent No.: US 9,548,952 B2
(45) Date of Patent: Jan. 17, 2017

(54) METHOD AND RADIO COMMUNICATION DEVICE FOR THE TRANSMISSION EFFICIENT EDITING OF MULTIMEDIA MESSAGES

(71) Applicant: Siemens Aktiengesellschaft, Munich (DE)

(72) Inventors: Andreas Schmidt, Braunschweig (DE); Markus Trauberg, Velchede (DE); Sabine Van Niekerk, Salzgitter (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 856 days.

(21) Appl. No.: 13/705,733

(22) Filed: Dec. 5, 2012

(65) Prior Publication Data

US 2013/0097267 A1 Apr. 18, 2013

Related U.S. Application Data

(63) Continuation of application No. 10/514,979, filed on Feb. 10, 2005, now abandoned.

(51) Int. Cl.
*H04L 12/58* (2006.01)
*H04L 12/14* (2006.01)
(Continued)

(52) U.S. Cl.
CPC ............. *H04L 51/10* (2013.01); *H04L 12/14* (2013.01); *H04L 12/1417* (2013.01);
(Continued)

(58) Field of Classification Search
None
See application file for complete search history.

(56) References Cited

U.S. PATENT DOCUMENTS 5,406,557 A * 4/1995 Baudoin ............. H04L 12/5835
370/407
5,958,006 A * 9/1999 Eggleston ........... H04L 12/5855
709/206
(Continued)

FOREIGN PATENT DOCUMENTS

DE 19944906 9/1999 ............. H04L 12/26
DE 10222156 A1 11/2003 ............... H04B 7/26
(Continued)

OTHER PUBLICATIONS

3GPP TS. 32.235 v4.5.0, Mar. 2003(3rd Generation Partnership Project; Technical Specification Group; Telecommunications Management; Charging Management; Charging data description for application services (Release 4).*

(Continued)

*Primary Examiner* — Ranodhi Serrao
*Assistant Examiner* — James Fiorillo
(74) *Attorney, Agent, or Firm* — Slayden Grubert Beard PLLC

(57) ABSTRACT

In order to edit, in a transmission-efficient manner, multimedia news before sending or receiving such news, the existing user data volume (VOL) of a piece of multimedia news (MM) is determined prior to, during, and after putting together such piece of multimedia news (MM). At least one application reducing the original user data volume (VOL) of such piece of multimedia news (MM) is supplied and run in case a predefined user data volume threshold (SGx) or an upper price limit (SPx) is exceeded.

16 Claims, 3 Drawing Sheets

(51) Int. Cl.
*H04L 29/06* (2006.01)
*G06Q 10/10* (2012.01)
*H04L 29/08* (2006.01)

(52) U.S. Cl.
CPC ........ *H04L 12/1421* (2013.01); *H04L 12/583* (2013.01); *H04L 12/5855* (2013.01); *H04L 29/06* (2013.01); *H04L 51/063* (2013.01); *H04L 67/2828* (2013.01); *G06Q 10/107* (2013.01); *H04L 12/5895* (2013.01); *H04L 51/066* (2013.01); *H04L 67/2819* (2013.01); *H04L 69/329* (2013.01)

(56) References Cited

U.S. PATENT DOCUMENTS

| | | | |
|---|---|---|---|
| 6,049,821 A | 4/2000 | Theriault et al. | 709/203 |
| 6,356,937 B1 | 3/2002 | Montville et al. | 709/206 |
| 6,377,978 B1* | 4/2002 | Nguyen | G06Q 10/107 |
| | | | 709/206 |
| 6,577,717 B1 | 6/2003 | Henon | 379/114.01 |
| 6,640,242 B1* | 10/2003 | O'Neal | H04L 12/5835 |
| | | | 370/401 |
| 6,823,365 B1* | 11/2004 | Mattis | G06Q 10/107 |
| | | | 709/206 |
| 6,947,396 B1* | 9/2005 | Salmi | H04L 12/1859 |
| | | | 370/310 |
| 6,958,006 B2 | 10/2005 | Wakazono | 451/65 |
| 6,996,393 B2 | 2/2006 | Pyhälammi et al. | 455/412.1 |
| 7,006,484 B2 | 2/2006 | Hayama et al. | 370/342 |
| 7,089,286 B1* | 8/2006 | Malik | H04L 51/066 |
| | | | 707/999.01 |
| 2001/0030235 A1* | 10/2001 | Hedemann | H04L 63/102 |
| | | | 235/451 |
| 2001/0038625 A1 | 11/2001 | Satoh | 370/352 |
| 2001/0041578 A1 | 11/2001 | Na | 455/466 |
| 2002/0013854 A1 | 1/2002 | Eggleston et al. | 709/234 |
| 2002/0078158 A1* | 6/2002 | Brown | H04L 12/583 |
| | | | 709/206 |
| 2002/0099681 A1* | 7/2002 | Gainey | G06Q 10/107 |
| 2002/0099766 A1* | 7/2002 | Tuli | G06F 17/30905 |
| | | | 709/203 |
| 2002/0177454 A1 | 11/2002 | Karri et al. | 455/466 |
| 2002/0199061 A1* | 12/2002 | Friedman | G06Q 10/107 |
| | | | 711/118 |
| 2003/0018815 A1 | 1/2003 | Spicer et al. | 709/246 |
| 2003/0021285 A1 | 1/2003 | Denninghoff | 370/428 |
| 2003/0182310 A1* | 9/2003 | Charnock | G06F 17/30716 |
| 2003/0193967 A1* | 10/2003 | Fenton | H04L 51/10 |
| | | | 370/490 |
| 2004/0024824 A1* | 2/2004 | Ferguson | H04L 12/5855 |
| | | | 709/206 |
| 2004/0215696 A1* | 10/2004 | Fisher | G06Q 30/02 |
| | | | 709/201 |
| 2004/0215724 A1* | 10/2004 | Smoot | H04L 51/22 |
| | | | 709/206 |
| 2005/0165665 A1 | 7/2005 | Koskinen et al. | 705/34 |
| 2005/0198161 A1* | 9/2005 | Rooke | H04L 12/5875 |
| | | | 709/206 |
| 2006/0078064 A1 | 4/2006 | Schmidt et al. | 375/296 |

FOREIGN PATENT DOCUMENTS

| | | | | |
|---|---|---|---|---|
| JP | 2166942 | A | 6/1990 | H04L 12/14 |
| JP | 4284746 | A | 10/1992 | H04L 12/14 |
| JP | 6085970 | A | 3/1994 | H04L 12/14 |
| JP | 6311159 | A | 11/1994 | H04L 12/14 |
| JP | 8163348 | A | 6/1996 | H01N 1/34 |
| JP | 10136189 | A | 5/1998 | H04N 1/32 |
| JP | 11027261 | A | 1/1999 | H04L 12/14 |
| JP | 11098301 | A | 4/1999 | H04N 1/00 |
| JP | 2000049774 | A | 2/2000 | H04L 12/14 |
| JP | 2002009818 | A | 1/2002 | G06F 13/00 |
| JP | 2002033947 | A | 1/2002 | G03B 19/02 |
| JP | 2002094505 | A | 3/2002 | G06F 13/00 |
| WO | 01/41391 | A2 | 6/2001 | H04L 29/00 |

OTHER PUBLICATIONS

3GPP TS. 32.235 v4.1.0, Mar. 2002(Universal Mobile Telecommunications System (UMTS); Telecommunications Management; Charging Management; Charging data description for application services Version 4.1.0 (Release 4).*
W3C, REC-smil-19980615, "Synchronized Multimedia Integration Language (SMIL) 1.0 Specification", W3C Recommendation; 39 pages, Jun. 15, 1998.
3GPP TS 22.140 V4.1.0, "3rd Generation Partnership Project; Technical Specification Group Services and System Aspects; Service Aspects, Stage 1 Multimedia Messaging Service (Release 4)", 12 pages, Mar. 2001.
3GPP TS 23.140 V5 1.0, "3rd Generation Partnership Project; Technical Specification Group Terminals; Multimedia Messaging Service (MMS); Functional Description; Stage 2 (Release 5)", 76 pages, Dec. 2001.
3GPP TS 23.040 V5.2.0, "3rd Generation Partnership Project; Technical Specification Group Terminals; Technical Realization of the Short Message Service (SMS) Release 5"; 143 pages, Dec. 2001.
3GPP TS32.235; "Charging data description for application services"; Apr. 2, 2003; 3GPP TS 32.235; v4.5.0 pp. 1-41, Apr. 2, 2003.
International Search Report; PCT/DE03/01478; pp. 2, Sep. 25, 2003.
S5-034160; "Reply LS on Alignment of MMS Message Size Definition"; Feb. 2, 2003; 3GPP TSGS#19(03)0052 (referred to as: SP-030052); Change Request S5-034160; pp. 1-7; downloaded from http://www.3gpp.org/ftp/tsg_sa/TSG_SA/TSGS_19/Docs/ PDF on Mar. 10, 2012.
Japanese Office Action, Japanese Patent Application No. 2009-32936, 7 pages, May 30, 2012.

* cited by examiner

FIG 1
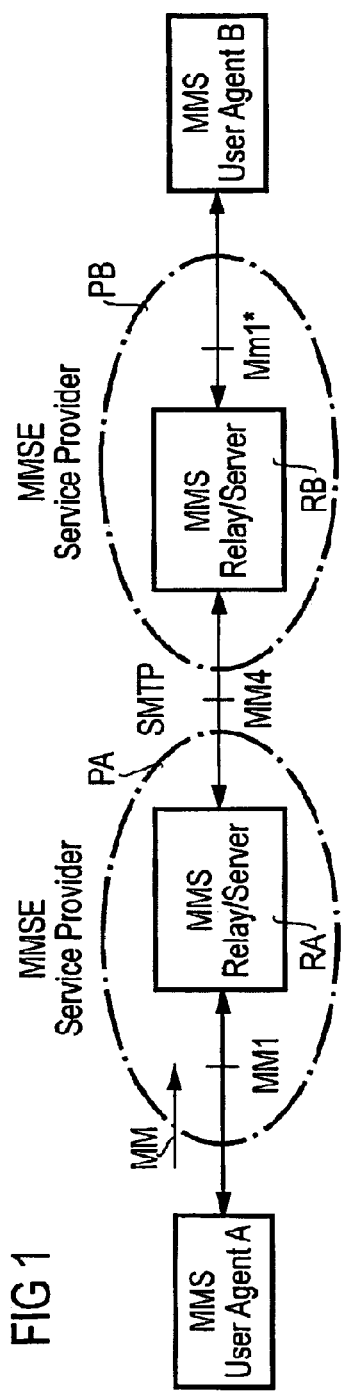
FIG 2
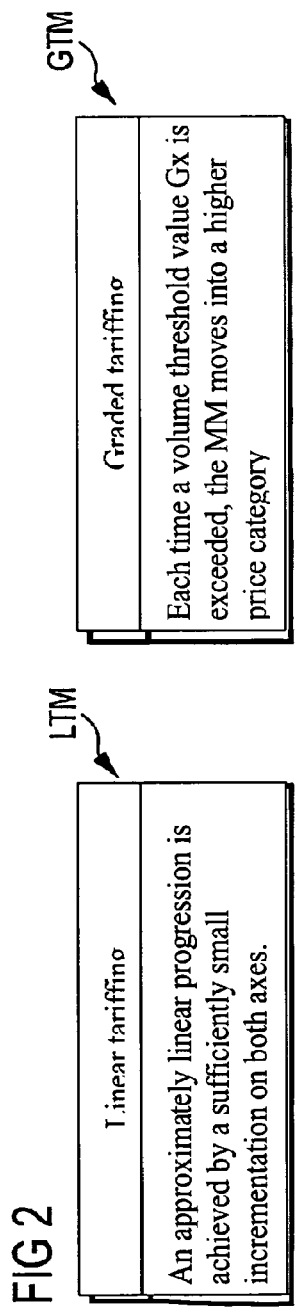
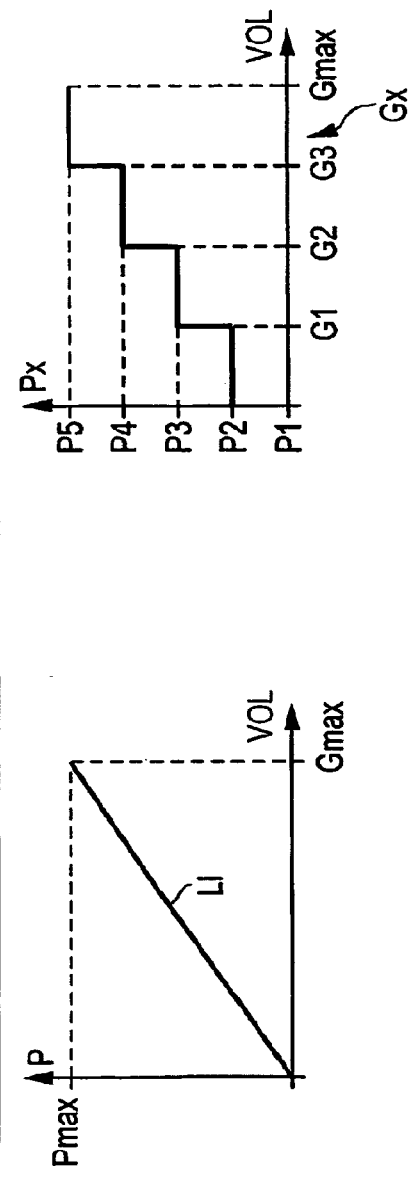

METHOD AND RADIO COMMUNICATION DEVICE FOR THE TRANSMISSION EFFICIENT EDITING OF MULTIMEDIA MESSAGES

CROSS-REFERENCE TO RELATED APPLICATIONS

This application is a is a continuation of U.S. patent application Ser. No. 10/514,979 filed on Feb. 10, 2005, which is U.S. National Stage Application of International Application No. PCT/DE03/01478 filed May 8, 2003, which designates the United States of America, and claims priority to DE Patent Application No. 10222156.1 filed May 17, 2012. The contents of which are hereby incorporated by reference in their entirety.

BACKGROUND OF THE INVENTION

The document US 2002/0013854 A1 discloses a method and an apparatus via which only the total amount of communication data transmitted between a remote communication unit and a communication server can be monitored and controlled.

The present invention is directed toward improving the cost transparency for the sender or recipient of a multimedia message that is to be transmitted.

SUMMARY OF THE INVENTION

Accordingly, a method is provided for the transmission-efficient editing of multimedia messages before they are sent or received, whereby prior to, after, and/or during the composition of the respective multimedia message to be sent or received, the existing, used user data volume of the multimedia message is determined, whereby the originally present, used user data volume of the multimedia message (MM) which is to be sent or received in a particular case is assigned to a price class of a tariffing system graded according to user data volume, and whereby if a predefinable price and/or user data volume upper limit is exceeded for the multimedia message which is to be sent or received in the particular case at least one reduction application is provided to reduce the originally present, used user data volume of the multimedia message which is to be sent or received in the particular case in order to make the multimedia message which is to be sent or received in the particular case belong to a lower price class of the tariffing system graded according to user data volume.

As a result, an improved cost transparency is provided in a simple and reliable way for the respective sender or recipient of multimedia messages before the respective multimedia message is actually sent or transmitted by the sender or received by the recipient. At least one reduction application is provided to reduce the originally present, used user data volume of the respective multimedia message which is to be sent or received in the event that a predefinable price and/or user data volume upper limit is exceeded. If this reduction application is applied to the respective multimedia message to be sent or received, for example by corresponding selection by the sender, then its present, used user data volume can be reduced so that transmission costs incurred during sending or receiving can be saved.

The present invention also relates to a radio communication device, particularly a mobile radio device, which is embodied to perform the method according to the present invention.

Additional features and advantages of the present invention are described, and will be apparent from, the following Detailed Description of the Invention and the Figures.

BRIEF DESCRIPTION OF THE FIGURES

FIG. 1 shows in a schematic representation an MMS (Multimedia Messaging Service) network architecture according to 3GPP between a sender and a recipient.

FIG. 2 shows a linear tariffing model contrasted with a graded tariffing model, wherein the cost of sending the respective multimedia message is higher, the greater the data volume of the multimedia message.

Elements having the same function and method of operation are identified in FIGS. 1 through 6 by the same reference symbols in each case.

DETAILED DESCRIPTION OF THE INVENTION

Figure 3:
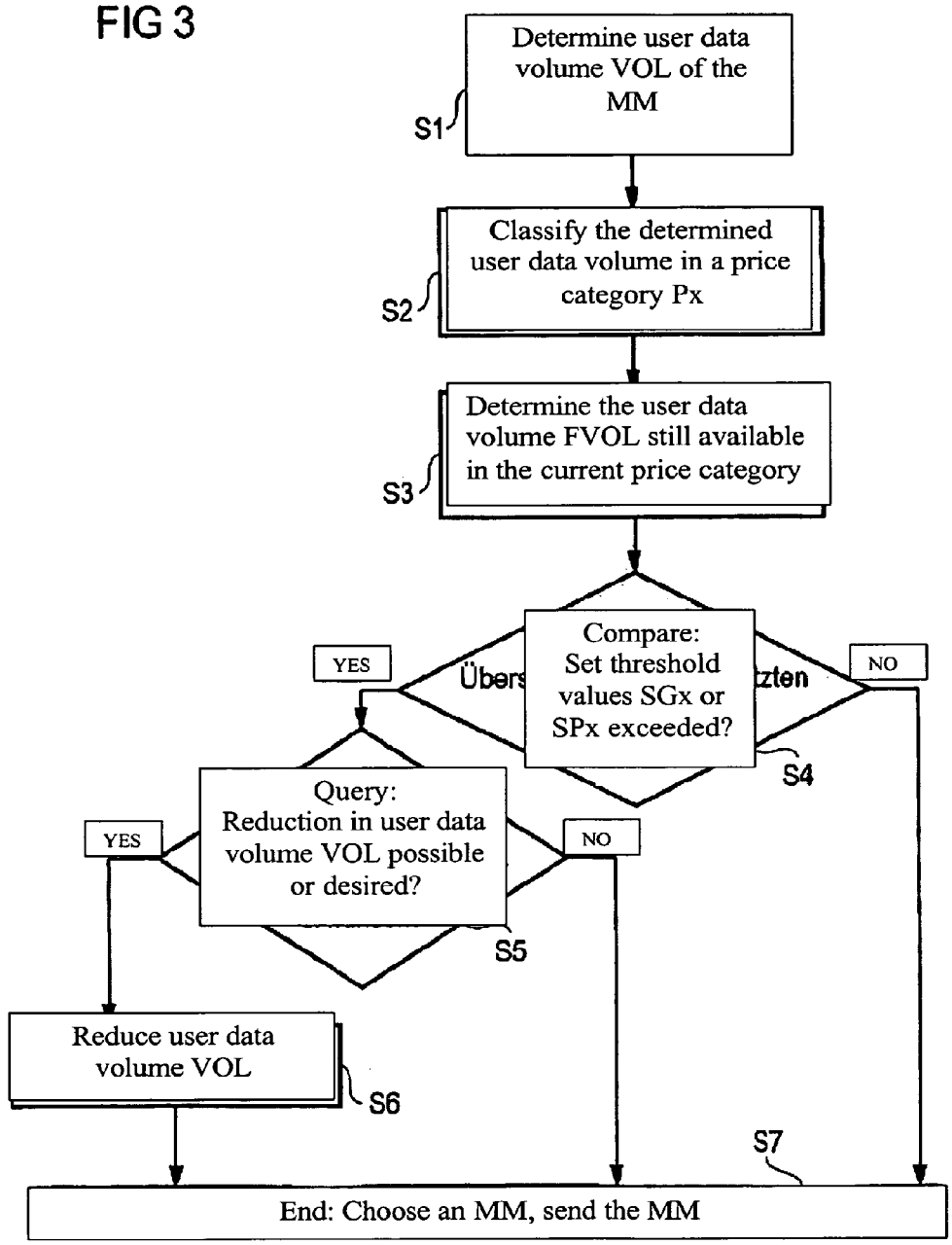
FIG. 3 is a graphical representation of the time sequence of an exemplary embodiment of the method according to the present invention illustrated with the aid of textually described method steps.

The mobile radio system GSM (GSM—Global System for Mobile Communications) provides not only voice telephony but also the possibility of sending and/or receiving short text messages of up to 160 characters in length. In GSM mobile radio systems, this service is called, in particular, SMS (Short Message Service) (for literature, see in particular [1] at the end of the description).

A multimedia-capable variant of a mobile messaging service, called MMS (Multimedia Messaging Service) (see in particular literature references [2] and [3] at the end of the description), is currently being standardized for mobile radio systems of the next generations (2.5G and 3G), such as, for example, UMTS (UNITS—Universal Mobile Telecommunications System). Messages with multimedia content will be referred to in the following description simply as MMs (Multimedia Message) for short, in order to differentiate them more clearly from SMS text messages. In contrast to SMS, there is no restriction to pure text content. With MMS (Multimedia Messaging Service), users can individually format their texts and/or embed audio and/or video content as well as other communication elements in a message. Accordingly, a multimedia message may consist of a number of multimedia message elements having different file types (e.g., audio or still image) and/or file formats (in the case of still images, for example, GIF or JPEG).

FIG. 1 illustrates the MMS network architecture according to the present state of the art from the viewpoint of 3GPP. There, by way of example, a multimedia message MM is transmitted from a first so-called MMS user agent A to a second MMS user agent B with the participation of an MMS relay/server RA and RB assigned on the send and receive side, respectively. Specifically, viewed in the transmission direction of the multimedia message MM, the relay/server RA is arranged downstream of the user agent A on the network side. The relay/server RB is disposed upstream of the second, receive-side user agent UB on the network side. The respective interface connection between the user agent A and the MMS relay/server RA assigned on the send side is designated in FIG. 1 by MM1, and the interface connection between the user agent B and the MMS relay/server RB assigned on the receive side is designated by MM1*. SMTP (Simple Mail Transfer Protocol) is chosen as the protocol on the interface MM4 between the two relays/servers RA and RB. The respective MMS user agent A or B is preferably understood to refer to an application or execution procedure which implements MMS. This application is implemented, in particular, as a software program on the respective radio communication device involved on the send side, its assigned MMS relay/server on the send side, on the respective radio communication device involved on the receive side and/or on its MMS relay/server assigned on the receive side. In this case, the respective radio communication device preferably may be embodied as a mobile radio device. Alternatively, the respective MMS user agent also may be implemented in a device (e.g., laptop or similar) connected to a mobile radio device. An MMS relay/server is a network element which makes the MMS functionality available in the coverage area MMSE (Multimedia Messaging Service Environment) of the respective MMS provider, such as, in this case, for example, PA, PB, to the MMS user agents A, B.

MMS providers or service providers can, on the one hand, provide, as the tariffing models for the new MMS service offering, that the sending of a multimedia message will be charged to the sender ("sending party pays" principle). On the other hand, it also may be provided, where applicable, that the recipient of a multimedia message is charged for the reception, on the MMS relay/server assigned on the receive side, of a notification about the presence of a multimedia message addressed to him/her and/or for the downloading of one or more message elements of this multimedia message from the MMS relay/server on the receive side.

In particular, a tariffing model for MMS which is based on what is referred to below as the "MM volume classes" principle could be of interest to future MMS providers of the GSMA (Global System for Mobile Communications Association), an international consortium of GSM mobile communication network carriers. The idea underlying this principle is that, in the interests of greater billing transparency, the multimedia message to be transmitted or received in a particular case is assigned on the basis of its current, used user data volume or its size (refer to FIG. 2, right-hand diagram GTM) to one of a number of predefined price categories or price—classes (a so-called "MM volume class") which is assigned to a specific price category or price class. User data volume or size of the respective multimedia message is understood in the context of the present invention to refer, in particular, to the total number of bytes or bits of the components or message elements of the respective multimedia message. In practice, a classification of the user data volume dimension in MMS, in particular, into three to four, and consequently clearly structured, "MM volume classes" can be advantageous. The right half of the schematic in FIG. 2 shows a diagram GTM for a tariff system graded in this way. Plotted along its abscissa are a number of threshold values G1 to Gmax (where max=4) for the user data volume VOL. These user data volume threshold values are assigned prices or cost values Px (where x=1 to 5) along the ordinates of the diagram. Between each pair of adjacent threshold values, such as, for example, G1, G2, the price or cost class assigned in each case, such as, for example, P3, is constant. Viewed as a whole, therefore, the result is a tariff system whose price classes increase in stages with increasing user data volume class. If the respective data volume threshold, such as G1, is exceeded, the price Px increases by a specific, predefinable amount. For example, the price increases from P3 to P4>P3 when the user data volume threshold G2 is exceeded. Overall, this then results in a successively increasing staircase curve or bar curve for the associated price Px from one user data volume threshold value to the next G1 to G4 and, consequently, a price graduation as a function of user data volume ranges such as, for example, 0 to G1, G1 to G2, G2 to G3, etc. Each time a data volume or size threshold of the multimedia message to be transmitted or received in a particular case is exceeded, the multimedia message moves in terms of its transmission costs from its previous price level Px to a next higher price level Px+1. If, in particular, a constant price rise amount is chosen in each case, each time a threshold is exceeded, then the staircase curve rises linearly in a first approximation.

A disadvantage with this approach is that every time a user data threshold value Gx (where x=1 to max, with max denoting the maximum number of defined threshold values) is exceeded (and no matter by how small an amount) in the user data volume dimension VOL, the respective multimedia message is immediately moved up into a higher price category Px (where x=1 to max; in this case in FIG. 2, for example, max=5). Even a single additional bit or byte can be crucial in determining whether a multimedia message belongs to a lower or higher price category Px. As a general rule, the smaller the number of threshold values Gx in the user data volume dimension VOL, the higher the probability that the sender or recipient of a multimedia message is not using or filling the maximum user data volume VOL, predefined by the current price category of the multimedia message, of the respective level to optimum effect (i.e., only incompletely), (see FIG. 2, right-hand illustration) and so is wasting paid-for transmission capacity. With a growing number of threshold values Gx in the user data volume dimension and a growing number of assigned price categories, it would be possible to approach a linear progression of the assigned prices P, as shown schematically in the left half of the diagram LTM in FIG. 2. There, the price P increases continuously as well as linearly in line with the user data volume of the multimedia message to be transmitted in a particular case. In this scheme, the maximum price Pmax is assigned to the maximum user data volume Gmax. Thus, the linear progression LI of the diagram LTM in FIG. 2 is approximately achieved between the user data volume VOL and assigned price P through a sufficiently small incrementation of user data volume threshold value ranges Gx–G(x–1) and associated price categories Px on both axes of the diagram GTM in the right half of FIG. 2. This linear tariff system, however, does conflict with the economic interests of the future MMS providers. Moreover, a continuous price/user data volume assignment of this kind is too complicated and costly for accounting purposes on the part of the respective provider and too lacking in transparency for the respective user.

The diagram LTM shown in the left half of FIG. 2, therefore, depicts an idealized, linear tariffing model, while the diagram GTM in the right half of FIG. 2 shows a graded tariffing model for real-world use. In both cases, the cost of sending a multimedia message is higher, the greater the present, used data volume VOL of the multimedia message to be transmitted or received in a particular case.

The following description sets out, by way of example, for the case of a multimedia message being sent, various advantageous ways in which the user of an MMS-capable communication terminal device, preferably a radio communication device, can be presented with various decision support aids via its so-called HMI (Human Machine Interface) unit in order to be able to send the multimedia message at maximum data volume efficiency and cost-effectively. At the same time, an advantageous method for optimizing the originally present user data volume of a multimedia message to be sent before it is sent using tariff models according to the explained "MM volume classes" principle also will be expounded. These method steps for the send case also may be applied in an analogous manner to the receive case, wherein a radio communication device receives, with the aid of its MMS user agent, the notification of the readiness to be retrieved of a multimedia message or one or more elements of the multimedia message residing on the receive-side MMS relay/server. A mobile station or a mobile radio device is used, in particular, as the radio communication device involved in the particular case.

Regardless of the tariffing model (linear or graded) finally chosen, it is always useful for the sender of a multimedia message, such as, for example, MM, to be able to estimate, before, during and/or after the composition of the multimedia message on his/her terminal device, how much it will cost him/her to send this multimedia message. This applies, in particular, to tariffing models based on the "MM volume classes," for in this case, in particular, it may be important that the sender of the respective multimedia message, such as, for example, MM, is not using the user data volume VOL of the currently (i.e., originally), assigned price category Px to optimum effect; i.e., is wasting a still free remainder of the data volume VOL linked or corresponding to the charged price category. This paid-for free volume is formed from the difference between the actual, currently present data volume of the respective multimedia message to be transmitted and the data volume threshold value which delimits the price category Px assigned and charged to the present data volume from the next higher price category Px+1.

According to a variant of the method according to the present invention, a sequence of steps is beneficial (see FIG. 3) which during or, as the case may be, after the composition of the respective multimedia message includes the following individual steps succeeding each other in time:

a) the originally present, used user data volume VOL of the respectively present multimedia message to be sent, such as, for example, MM, is determined;

b) the determined user data volume VOL of the multimedia message to be sent is assigned to a corresponding price class or price category Px;

c) the user data volume FVOL still available is calculated for the currently present price class Px which is assigned to the originally present, used user data volume of the multimedia message to be sent on the basis of the respective predefined tariff system, for this purpose the difference is formed between the user data volume Gx+1 of the predefined tariff system, which user data volume is assigned to the next higher price class Px+1, and the currently present user data volume VOL of the multimedia message;

d) possible overshoots of user-defined price and/or user data volume upper limits are determined and, where applicable, the user's attention drawn thereto;

e) the results of the determining step a) and/or of the assignment step b) and/or of the calculation step c) and/or of the possible upper limit overshoot according to step d) are indicated to the user in acoustic, tactile and/or graphical form;

f) the user is presented with one or more suggestions for reducing the originally present user data volume of the multimedia message to be sent, primarily with the aim of making the multimedia message belong to a lower price category of the predefined tariff system; and g) the user data volume of the multimedia message to be sent is reduced, likewise with the aim of making the multimedia message belong to a lower price category of the predefined tariff system.

A further variant is advantageous in which all the method steps a) through g) are performed directly in the sending MMS user agent in each case. As an alternative to this, however, a further variant is also beneficial in which the method steps a) to g) are performed by at least one autonomous functional unit; i.e., one that is independent of the MMS user agent. Where applicable, it can be advantageous in both cases to perform merely a subset of the method steps a) to g). For example, determining the price class of the multimedia message to be sent which is associated with the used user data volume, calculating the user data volume still available for the determined current price category, and indicating all this information, as well as reporting possible overshoots of user-defined price and/or user data volume upper limits that have occurred, are advantageous as basic steps.

In the case of method steps which are executed by an autonomous functional unit, it is beneficial if certain information is made available to the autonomous functional unit by the MMS user agent depending on the function or task of the corresponding functional unit, such as the used user data volume of the respective multimedia message to be sent, as determined by the MMS user agent, or the fully or partially composed ready-to-send multimedia message itself.

In both cases (all method steps are performed directly in the MMS user agent (see A in FIG. 1) of the sending communication unit, or individual or all method steps are performed by at least one autonomous functional unit), it is beneficial if either the MMS user agent or the at least one autonomous functional unit has access to certain information of a predefined tariff system, such as to a tariff/user data table, such as, for example, GTM in FIG. 2, in order to be able to assign the determined user data volume of the multimedia message to be sent in a particular case to a price class, and/or to the price and/or user data volume upper limits set by the user in order to be able to draw attention to possible overshoots. Information of this kind can be stored either in internal memory areas of the respective communication terminal device or in external memory units which can be connected to the terminal device via cable, electrical contacts or wirelessly.

One preferred embodiment for storing the data on an external memory unit is present when the external memory unit is an intelligent memory card (known as a smartcard), such as an SIM (Subscriber Identity Module) card or a UICC card with (U)SIM which is inserted into the mobile terminal device, for on these cards there are memory areas which can only be written or updated by the network carrier, and other memory areas for which the user also has read and write permissions. The first-mentioned are particularly suitable for storing and subsequent OTA (Over The Air) updating of the individual MMS tariff information of the respective MMS provider; for example, on the basis of the "MM volume classes" principle. The latter-mentioned memory units are suitable for storing user-defined price and/or user data volume upper limits. This embodiment in which tariff information of the network carrier is stored on the SIM card or, as the case may be, UICC card with (U)SIM is advantageous because the latest tariffs for the above-described calculations or comparisons may always be referred to thanks to the possibility of OTA updates.

An advantageous embodiment for performing single or multiple steps of the above method in a functional unit that is independent of the respective MMS user agent is present when the application reducing the data volume of the respective multimedia message also executes on the SIM card (SAT application) or UICC with (U)SIM (CAT or (U)SAT application).

Furthermore, it is also possible to update the tariff information stored on the respective terminal device or on the external memory unit (e.g., SIM card or UICC with (U)SIM) through use of a general data link between the terminal device and a server in the radio network via the air interface. This action can be initiated either by the functional unit on the respective terminal device ("Pull") or by the server in the network ("Push)service.

The individual method steps a) to g) already mentioned above will be explained in greater detail below with reference to FIG. 3:

First, a multimedia message, such as an MM, is composed for sending in the MMS user agent, such as A in FIG. 1, of the radio communication device of the sender. A multimedia message of this kind essentially consists of a "header," which mainly contains information relating to the transmission and/or administration of the multimedia message, and what is referred to as a "body part," which can consist of a number of multimedia message elements (i.e., the actual user data), whereby the use of different file types and file formats is possible, as explained in the introduction.

The user data volume VOL of a multimedia message, such as, for example, MM (step S1 in FIG. 3) is determined or, as the case may be, calculated, for example, by the totaling of all data volumes of the individual MM elements, as well as the size of the header field named "Subject" for the subject of the multimedia message. It also may be beneficial that the lengths or sizes of the header fields used for addressing the multimedia message (such as, for example, "CC" and "Bcc"), as well as presentation descriptions possibly contained in the multimedia message (for example, an SMIL—(Synchronized Multimedia Integration Language; see [4]) presentation are also added to the user data volume of the multimedia message to be sent.

If the currently present user data volume VOL of the multimedia message MM to be sent has been determined according to step S1 in FIG. 3 and is therefore known, the associated price category can be determined in a simple—manner; for example, by reference to a stored tariff table such as GTM in FIG. 2 (see step S2 in FIG. 3). Equally, the still available (i.e., unused) user data volume FVOL can be calculated for the price class which is assigned to the originally present user data volume on the basis of the tariff table. The free user data volume FVOL then corresponds to the maximum number of bytes which can be added before the multimedia message MM moves into a higher price category (see step S3 in FIG. 3). Thereafter, the determined user data volume VOL and/or the assigned price class Px are then compared in an advantageous manner with previously defined(i.e., specifiable or predeterminable) user data volume and/or price upper limits SGx, SPx (see step S4 in FIG. 3). If one of these set upper limits is exceeded, the multimedia message MM is analyzed, preferably automatically, to determine whether and how the user data can be reduced. Ideally, each multimedia message element is considered individually for this purpose. In this case, the previously defined user data volume and price upper limits may have been specified
by the respective user, and/or
by the respective MMS provider.
The following examples describe different advantageous possibilities for reducing the data volume of a file:

a) file type conversion (e.g., conversion of a file of type "film" into a number of files of type "still image" in order to produce a number of so-called "snapshots" from a sequence of images);

b) file format conversion (e.g. with files of type "still image": compression of BMP into JPG; with files of type "audio": compression of WAV into MP3); with still images, reduction of the color depth and/or size, for example, is also possible; and c) There are also further data compression methods in addition to the possibilities explicitly listed here and it is furthermore possible to combine a number of conversion techniques with one another (for example: first change size of an image, then perform file format conversion).

The compression techniques mentioned represent a subset of the file format conversions and their primary objective is to reduce the size of a file. With some of these techniques it is possible to achieve, in particular, a compression ratio of 10:1, sometimes even substantially more.

Following this (if applicable after checking with the respective sender or possibly after confirmation by the sender), the user data volume VOL of the respective analyzed multimedia message, such as MM in this case, is beneficially reduced (see step S5 in FIG. 3) in that the size of at least one multimedia message element is reduced (for example by conversion/compression) and at least one new, smaller multimedia message consisting of at least one modified multimedia message element is composed (see step S6 in FIG. 3). The thus modified multimedia message having one or more message elements reduced in terms of the user data volume is then advantageously offered to the sender as an alternative for sending (see step S7 in FIG. 3).

After each of these individual steps S1 through S7 succeeding one another in time, an output message optionally may be issued to the user via the HMI. A display in the form of a bar chart is preferably suitable for the output of the determined user data volume VOL of the multimedia message to be sent in a particular case, such as, for example, MM, the price category Px assigned to the user data volume, the so far unused (i.e., still free) user data volume FVOL in the current price category and/or the reporting of possible overshoots of user-defined price and/or user data volume upper limits SGx, SPx via the HMI (Human Machine Interface) of the radio communication device involved in the particular case. A bar chart of this kind is illustrated in relation to each of the exemplary embodiments in FIGS. 4 to 6 and is designated by BK.

In the two examples which now follow, the sender would like to send a multimedia message MM which consists, for example, of two multimedia message elements such as, for example, a text element and a still image.

EXAMPLE 1

Assumptions:
In order to save money the user would like to send as a maximum(i.e., at most), multimedia messages of the price category P2.
The user-defined price upper limit SPx=P3 is exceeded during composition of the multimedia message MM.
The user may have suggestions presented to him/her for reducing the present user data volume VOL of his/her multimedia message MM.
The user composes the multimedia message MM consisting of two multimedia message elements (MM elements for short) according to his/her individual ideas with the aid of an "MM composer" (i.e., multimedia composer), procedure.

Figure 4:
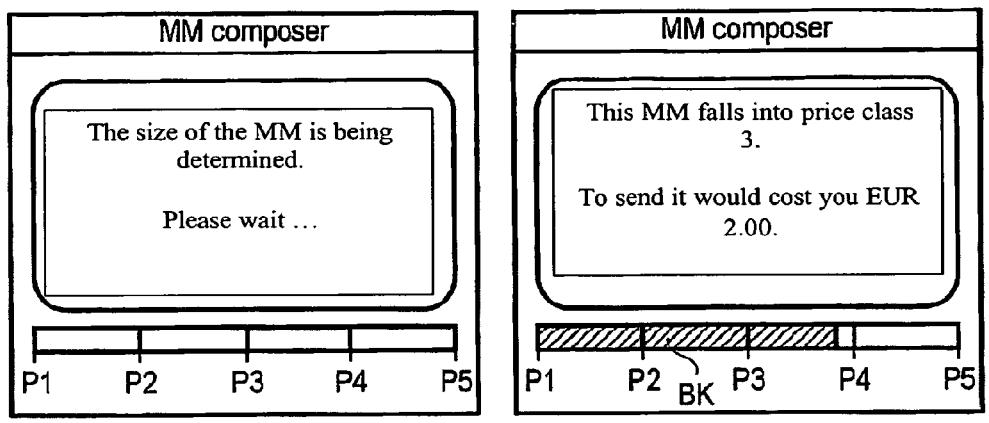
FIGS. 4 to 6 show exemplary embodiments of the HMI unit (HMI: Human Machine Interface) for a mobile radio communication device during the performance of different variants of the method according to the present invention.

The first MM element is of type "text", the second is a still image in the BMP format. The sender then has the user data volume of his/her multimedia message MM and the associated price category calculated (see FIG. 4, left). The result shows that the multimedia message MM exceeds the threshold value SPx=P3 defined by the user (see FIG. 4, right). FIG. 4 therefore illustrates an exemplary embodiment of the HMI (part 1) in which, in the left half of FIG. 4, a message is displayed during the calculation of the (user) data volume VOL of the multimedia message to be transmitted, while an output of the price category Px assigned on the basis of the predefined tariff table is displayed in the right half of FIG. 4. It is therefore determined on the basis of the provider's predefined tariff system, such as, for example, according to GTM in FIG. 2, which price class corresponds to the currently present user data volume of the multimedia message.

Figure 5:
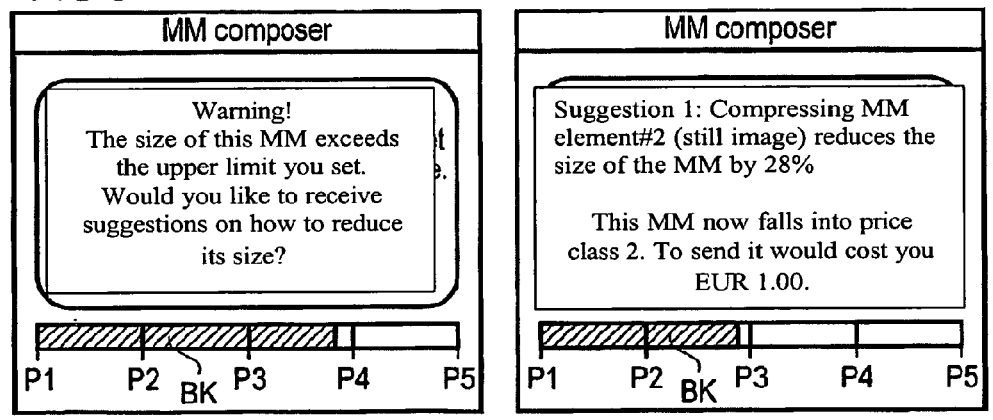

The sender is made aware of this fact via the HMI of the sender communication device and asked whether he/she would like to be presented with alternative suggestions for the present multimedia message MM to be sent (FIG. 5, left half of diagram). The compression of the second MM element (for example, from BMP to JPG) lends itself as a way of generating an alternative suggestion for the multimedia message MM considered here, consisting of a text and an uncompressed still image. To that end, FIG. 5, right half of diagram, shows a possible output of the HMI of the terminal device. The sender sees immediately, such as by reference to the bar chart BK, that the alternative multimedia message MM lies within the desired price class P2: the set or, as the case may be, selected threshold value SPx=P3 is no longer exceeded. The sender now has the possibility of sending the multimedia message MM modified according to the present invention by the MMS user agent A with unchanged information content at more favorable conditions than the message which he/she initially composed himself/herself. FIG. 5 therefore illustrates an exemplary embodiment of the HMI (part 2) in which, on the left, a warning is displayed that the MM is exceeding a user-defined threshold and, on the right, an output of the price class of the MM with reduced (user) data volume is displayed.

EXAMPLE 2

Assumptions:
In order to save money, the user would like to send, as a maximum, multimedia messages of the price category P2.
The respective multimedia message MM falls into the price category P2, although it is substantially below the user-defined price upper limit SPx=P2.
The user is alerted to the user data volume FVOL so far still unused in the current price category P2.

Figure 6:
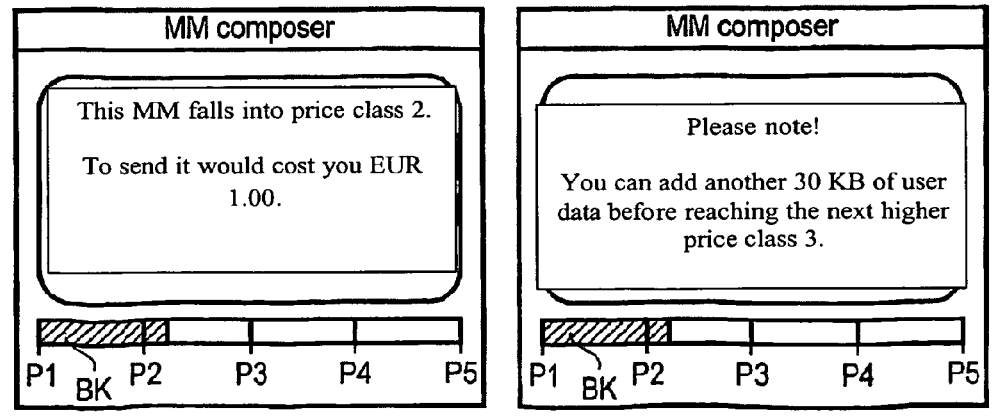

The user composes a multimedia message, such as, for example, MM, whereby the first MM element is to consist of a file of type "text." As the sender is uncertain what size his/her MM has already assumed as a result of the text (in other words: whether he/she is still below a defined threshold value P3), he first has the currently present user data volume VOL of his/her multimedia message and the associated price category determined and calculated respectively. The result of the calculation is displayed to the user; for example. via a bar chart BK. Here, the sender sees immediately that the analyzed multimedia message lies within the desired price class: the price class threshold value P3 has not yet been exceeded (see FIG. 6, left). The sender is also informed of the user data volume FVOL that is still available and can integrate a second MM element (in this case, for example, a 30-kbyte still image) into the multimedia message (FIG. 6, right) without second thoughts. FIG. 6 therefore illustrates an exemplary embodiment of the HMI (part 3) in which the output of the determined price category is displayed on the left, while, on the right, a message is issued indicating that the user data volume of the currently assigned price category has not yet been fully used.

To sum up, it is possible to achieve optimized editing of the multimedia message to be transmitted in a particular case in an advantageous manner in the following ways:

It can be sufficient for a first improvement to determine, before sending the respective multimedia message, after and/or during the composition of the respective multimedia message, the user data volume VOL of multimedia message. In the event of a predefinable user data volume upper limit, such as SGx, or a predefinable price upper limit, such as SPx, being exceeded, at least one reduction application is provided to reduce the user data volume of the multimedia message. In the process, the respective user is beneficially made aware that the respective upper limit is being exceeded. Various ways of reducing the user data volume of the multimedia message to be sent in a particular case also are then beneficially presented to the user via the HMI of his/her communication device for selection and implementation.

In an analogous manner, a similar procedure also may be followed in addition to or independently of the above for a multimedia message that is to be received.

In this way, the described method (regardless of the tariffing model finally chosen for MMS) is advantageous because it may reliably inform the respective sender or recipient of a multimedia message how big a multimedia message composed on the respective radio communication terminal device is; i.e., what user data volume VOL it currently has. This can be characterized, for example, by the total number of bytes or bits of the components of the respective multimedia message.

If tariffing models based on the non-linear principle of the "MM volume classes" (see diagram GTM in FIG. 2, right half of schematic) are introduced for the MMS service, further advantages are added to the above. The sender or recipient of a multimedia message is reliably informed about which assigned price category a multimedia message to be sent or received is in with regard to its original user data volume, and whether the current price category of the multimedia message is being used to optimum effect. In other words, it is determined how much user data FVOL still may be added within the price class assigned to the currently present user data volume based on the given tariff system, since it was previously unfilled, before the multimedia message is assigned to the next higher price category of the tariff system. In addition, the sender of a multimedia message always may be alerted whenever the threshold values which either the sender or the MMS provider has set, such as price category threshold values SPx and/or user data volume threshold values SGx, are exceeded (see FIG. 3).

Thus, an advantageous method is provided which offers the sender or recipient of a multimedia message that is to be sent or received many aids for estimating the user data volume of this multimedia message and implicitly also the ensuing costs.

In particular, in the planned tariffing of the MMS based on the principle of "MM volume classes" according to the principle shown in FIG. 2, an automatic adjustment of the user data volume of a multimedia message on the basis of user-defined limit values can be performed with the aim of making the multimedia message belong to a lower price category and, thus, save costs for the sending of a multimedia message.

At the same time, the user data volume VOL of the multimedia message of a chosen price class, such as, for example, P1-P5 in FIG. 2 (right-hand side, GTM) of the predefined tariff system in a particular case may be determined. The still available user data volume, such as FVOL, of the respective multimedia message is beneficially determined compared to the respective selected user data volume upper limit (such as SGx) and/or compared to a price upper limit (such as. SPx) related or linked to a specific user data volume. It can be advantageous, in particular to determine the still available user data volume FVOL of the multimedia message, which user data volume is assigned to the price class of the present, used user data volume of the multimedia message on the basis of the tariff system. In an advantageous manner, the still available user data volume FVOL may be filled either partially or completely by further user data or additional information. In the event that a user data volume upper limit SGx assigned to a selected price class such as, e.g., P2 is possibly exceeded, at least one reduction application is beneficially provided to reduce the user data volume VOL of the respective multimedia message. It can be particularly beneficial to draw the user's attention to the fact that user-defined price and/or user data volume upper limits SPx, SGx are possibly being exceeded.

Particularly advantageous is a step sequence in which:

a) the user data volume VOL of the multimedia message to be sent or to be received in a particular case is determined;

b) the determined user data volume VOL is assigned to a price class such as, e.g., P1-P5 on the basis of a predefined tariff system;

c) the still available user data volume FVOL for the current price class such as, e.g., P2 is determined;

d) attention is drawn to possible overshoots of user-defined (price and/or user data volume) upper limits such as, e.g., SPx, SGx;

e) the results determined in step a) and/or the assignment made in step b) and/or the calculation performed in step c) and/or the possible overshoot according to step d) are indicated to a user in acoustic, tactile or graphical form;

f) the user is presented with at least one suggestion for reducing the user data volume primarily with the aim of making the multimedia message belong to a lower price category; and g) a reduction of the user data volumes is performed after confirmation by the user or automatically in such a way that the edited multimedia message has been made to belong to a lower price category.

Preferably, the different variants of the method according to the present invention are performed directly in at least one MMS user agent. As an alternative to this, the method steps or a subset thereof also may be performed by at least one autonomous functional unit that is independent of the MMS user agent. To that end, it can be useful if the autonomous functional unit is provided by the respective MMS user agent with the user data volume VOL, determined by the MMS user agent, of the respective multimedia message to be transmitted or with the fully or partially composed multimedia message. It may be beneficial that either the respective MMS user agent and/or the at least one autonomous functional unit has access to certain information, in particular to data in tabular form, in order to be able to assign the determined user data volume VOL to a price class, such as, e.g., P1-P5, or to price and/or user data volume upper limits set by the user, such as, e.g., SPx, SGx, in order to be able to draw attention to possible overshoots. Information of this kind preferably may be stored in internal memory areas of a terminal device; in particular, a radio communication device. In addition or alternatively to this, this type of information may be stored in external memory units which can be connected to a terminal device via cable and/or wirelessly. Advantageously, the external memory unit is a SIM card or a UICC with (U)SIM which can be inserted into a mobile terminal device.

Memory areas which can be written or, as the case may be, updated solely by the network carrier are beneficially used for the storing and subsequent OTA updating of the individual items of MMS tariff information. Memory areas for which the respective user also possesses read and write permissions advantageously may be used for storing the user-defined price and/or user data volume upper limits.

In particular, a reduction application on a SIM card (SAT application) or on a UICC with (U)SIM (CAT or (U)SAT application) is used as the executing functional unit.

An output message for indicating a possible overshoot of a user data volume upper limit SGx and/or price class upper limit SPx is communicated to a user via at least one HMI (Human Machine Interface), preferably in acoustic, tactile or graphical form. For optical output of the results or comparisons, a bar chart is particularly suitable.

In order to reduce the user data volume of a multimedia message element, in particular a file type conversion, a file format conversion, a compression technique (subset of the file format conversion), and/or, in the case of still images, a reduction of the color depth and/or the size can be applied to at least one multimedia message element of the multimedia message to be sent or received in a particular case. Beneficially, at least two ways of reducing the user data volume of a multimedia message element are performed in combination with each other; in particular, sequentially.

The user data volume VOL of a multimedia message preferably may be determined by the totaling of all data volumes of the individual multimedia message elements of the multimedia message. In addition, where applicable, at least one header field possibly present in the header part of the multimedia message, in particular the sizes of the header fields "Subject" for the subject of the multimedia message, as well as "Cc" and "Bcc" for the addressing of the multimedia message, can be partially or completely included in the calculation of the user data volume. Where applicable, presentation descriptions contained in the multimedia message also may be partially or completely included in the calculation of the user data volume.

Although the present invention has been described with reference to specific embodiments, those of skill in the art will recognize the changes may be made thereto without departing from the spirit and scope of the present invention as set forth in the hereafter appended claims. In the foregoing reference was made in particular to the following relevant literature:

[1] 3GPP TS 23.040 Version 5.2.0, Release 5; Third Generation Partnership Project; Technical Specification Group Terminals; Technical Realization of the Short Message Service (SMS).

[2] 3GPP TS 22.140 Version 4.1.0, Release 4; Third Generation Partnership Project; Technical Specification Group Services and System Aspects; Service Aspects; Stage 1; Multimedia Messaging Service (MMS).

[3] 3GPP TS 23.140 Version 5.1.0, Release 5; Third Generation Partnership Project; Technical Specification Group Terminals; Multimedia Messaging Service (MMS); Functional Description; Stage 2.

[4] W3C Recommendation 15 Jun. 1998: "Synchronized Multimedia integration Language (SMIL) 1.0 Specification"—http://www.w3.org/TR/REC-smil/.

What is claimed is:

1. A method for transmission-efficient editing of a multimedia message before sending or receiving the multimedia message, the method comprising the steps of:
   determining by a processor a user data volume of a multimedia message to be sent or received by:
   summing up all data volumes of each single multimedia message element of said multimedia message; and
   adding to the summed data volumes a size of a "subject" header field of a header portion of the multimedia message, the "subject" header field indicating a theme of the multimedia message;
   comparing, by the processor, the determined user data volume of the multimedia message to a user data volume threshold value; and
   based on a result of the comparison:
   modifying, by the processor, the multimedia message to produce a modified multimedia message having a reduced data volume compared to the multimedia message;
   presenting to a user a selection between the multimedia message and the modified multimedia message having the reduced data volume;
   receiving from the user a selection of the modified multimedia message having the reduced data volume; and
   communicating, by the processor, the user-selected modified multimedia message having the reduced data volume.

2. The method of claim 1, further comprising adding to the user data volume at least one of (a) a size of a "Cc" header field for addressing the multimedia message and (b) a size of a "Bcc" header field for addressing of the multimedia message.

3. The method of claim 1, further comprising adding to the user data volume a size of a presentation description included in the multimedia message.

4. The method of claim 1, further comprising determining a still available data volume for the multimedia message based on the comparison of the determined user data volume with the user data volume threshold value.

5. The method of claim 1, wherein the user data volume is calculated by at least one MMS user agent.

6. The method of claim 1, wherein the user data volume is calculated by an autonomous functional unit that is independent of an MMS user agent.

7. The method of claim 1, wherein the user data volume threshold value is defined by at least one of a respective user and an MMS service provider.

8. The method of claim 1, further comprising accessing the predefined user data volume upper limit from an internal memory device of a mobile terminal device.

9. The method of claim 1, further comprising accessing the predefined user data volume upper limit from a SIM card or a UICC with (U)SIM associated with a mobile terminal device.

10. A wireless communication device for transmission-efficient editing of a multimedia message before sending or receiving the multimedia message, comprising:
    logic instructions embodied in non-transitory computer readable media and executable by a processor to:
    calculate a user data volume of a multimedia message to be sent or received by:
    summing up all data volumes of each single multimedia message element of said multimedia message; and
    adding to the summed data volumes a size of a "subject" header field of a header portion of the multimedia message, the "subject" header field indicating a theme of the multimedia message;
    determining a price associated with the determined user data volume;
    compare the determined price associated with the determined user data volume of the multimedia message to a price threshold value; and
    based on a results of the comparison:
    modify the multimedia message to produce a modified multimedia message having a reduced data volume and a corresponding reduced price compared to the multimedia message;
    presenting to a user a selection between the multimedia message and the modified multimedia message having the reduced data volume and corresponding reduced price;
    receiving from the user a selection of the modified multimedia message having the reduced data volume and corresponding reduced price; and
    communicate the user-selected modified multimedia message having the reduced data volume.

11. The wireless communication device of claim 10, wherein calculating the user data volume further comprises adding to the user data volume at least one of (a) a size of a "Cc" header field for addressing the multimedia message and (b) a size of a "Bcc" header field for addressing of the multimedia message.

12. The wireless communication device of claim 10, wherein calculating the user data volume further comprises adding to the user data volume a size of a presentation description included in the multimedia message.

13. The wireless communication device of claim 10, wherein the logic instructions are further configured to determine a still available budget for the user based on the comparison of the determined price associated with the determined user data volume of the multimedia message with the price threshold value.

14. The wireless communication device of claim 10, wherein the logic instructions are embodied in at least one MMS user agent.

15. The wireless communication device of claim 10, wherein the logic instructions are embodied in an autonomous functional unit that is independent of an MMS user agent.

16. Software stored in non-transitory computer readable media and executable by a processor to calculate a user data volume of a multimedia message to be sent or received by:
    summing up all data volumes of each single multimedia message element of said multimedia message;
    adding to the summed data volumes a size of a "subject" header field of a header portion of the multimedia message, the "subject" header field indicating a theme of the multimedia message;
    comparing the determined user data volume of the multimedia message to a user data volume threshold value; and
    based on a result of the comparison:
    determining a modified multimedia message having a reduced data volume compared to the multimedia message;
    presenting to a user a selection between the multimedia message and the modified multimedia message having the reduced data volume;
    receiving from the user a selection of the modified multimedia message having the reduced data volume; and generating and communicating the user-selected modified multimedia message having the reduced data volume.

* * * * *